United States Patent
Ranganath et al.

Patent Number: 5,636,266
Date of Patent: Jun. 3, 1997

[54] WIRELESS CALLER INFORMATION PROCESSING SYSTEM

[75] Inventors: Krishnappa Ranganath; Mehul Desai, both of Milwaukee, Wis.

[73] Assignee: MTI International, Menomonee Falls, Wis.

[21] Appl. No.: 602,094

[22] Filed: Feb. 15, 1996

[51] Int. Cl.$^6$ .................................................. H04Q 7/26
[52] U.S. Cl. .................................................. 379/58; 379/63
[58] Field of Search .................................. 379/56, 58, 63, 379/89, 140

[56] References Cited

U.S. PATENT DOCUMENTS

| | | | |
|---|---|---|---|
| 5,465,401 | 11/1995 | Thompson | 455/89 |
| 5,475,736 | 12/1995 | Ito | 379/63 |
| 5,553,125 | 9/1996 | Martensson | 379/140 |
| 5,559,860 | 9/1996 | Mizikovsky | 379/58 |
| 5,559,861 | 9/1996 | Takehisa | 379/58 |

*Primary Examiner*—William Cumming
*Attorney, Agent, or Firm*—Robert J. Black

[57] ABSTRACT

A wireless caller identification system employing master and remote units. Microcontrollers at both master and remote units facilitate secure communications between units, providing the identity of the source of calls received at the master unit over a connected telephone line from a telephone central office. Radio frequency (RF) or infrared (IR) modes of communication may be used.

15 Claims, 3 Drawing Sheets

MULTI-LINE APPLICATION

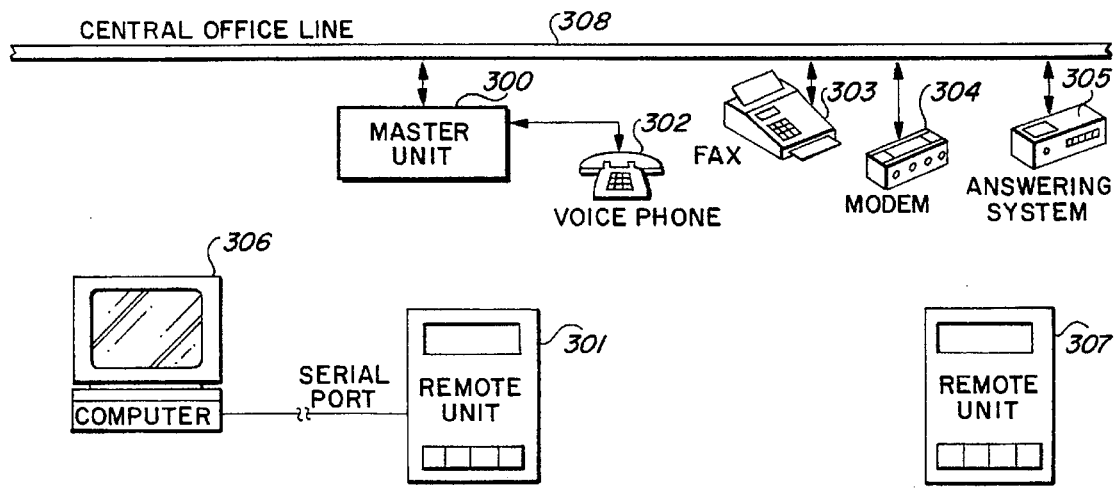
SINGLE LINE APPLICATION FIG. 3
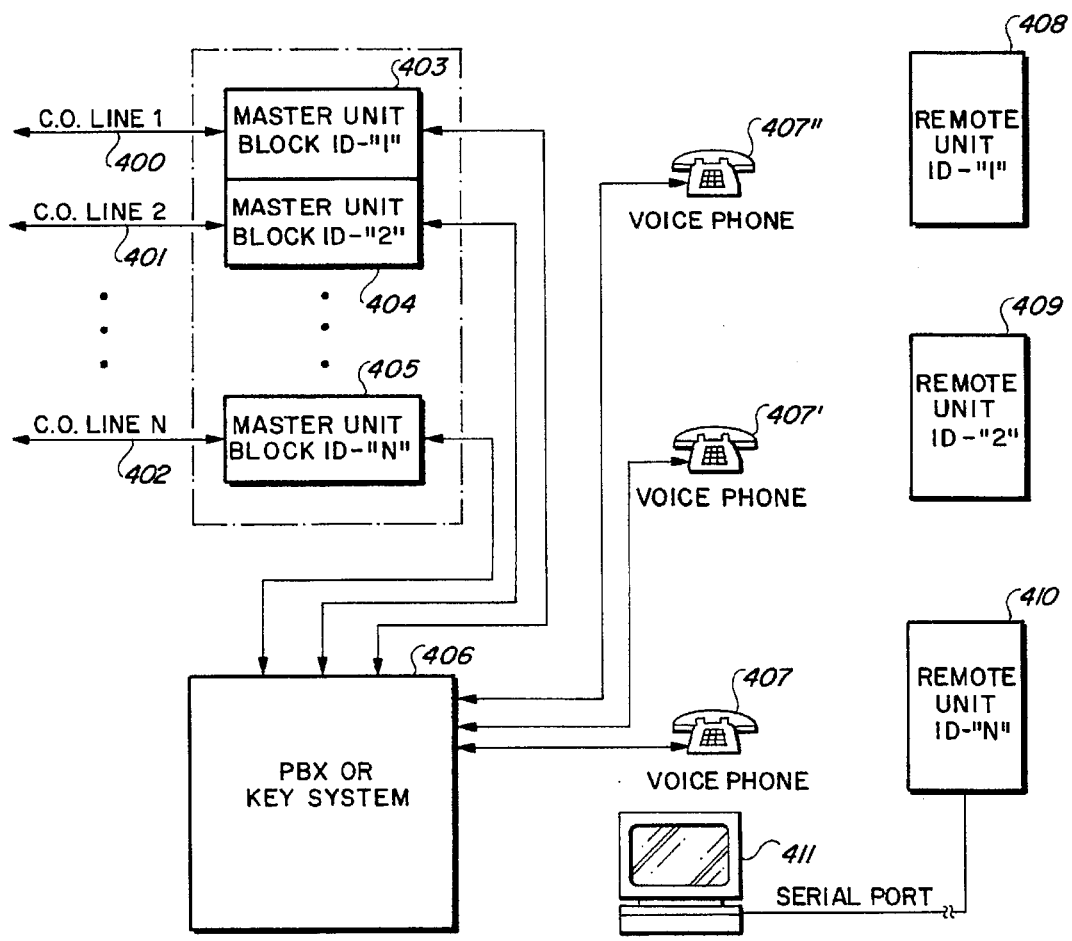
MULTI-LINE APPLICATION FIG. 4

WIRELESS CALLER INFORMATION PROCESSING SYSTEM

BACKGROUND OF THE INVENTION

1. Field of the Invention

The present invention is drawn to subscriber telephone apparatus, and more particularly to a caller identification device which displays the caller's telephone number and name, or similar identification, and then distributes the displayed information to remote areas by means of a wireless medium.

2. Background Art

Many telephone companies throughout the world are now offering calling number display features (CND) as part of optional service to regular telephone subscribers. In the usual arrangement, and particularly in the United States, many operating companies providing this service provide a device to the customer, or telephone subscriber, which provides identification of the calling party via a visual display connected to the telephone line. This feature allows the user to screen incoming calls and answer only when desired. With this arrangement, the telephone system provides from the telephone central office a set of signals during the ring cycle which are decoded at the customer's premises and displayed on the calling number display.

As outlined above, the arrangement described is quite satisfactory for a single subscriber, but is not applicable to telephone systems wherein a number of stations are connectable to the same telephone line. There are a number of techniques provided to overcome this particular drawback, and accordingly a search of the background art directed to the subject matter of the present invention conducted in the U.S. Patent and Trademark Office disclosed the following U.S. Letters Patent:

| | |
|---|---|
| 4,942,598 | 5,228,073 |
| 5,063,588 | 5,274,699 |
| 5,070,521 | 5,327,486 |
| 5,155,759 | 5,375,161 |

U.S. Pat. Nos. 4,942,598 and 5,375,161 both deal with paging systems employing wireless communication medium as a means for accessing parties to be paged. U.S. Pat. No. 4,942,598 also includes a caller number identification system, while U.S. Pat. No. 5,375,161 includes a memory for storing electronic signals representative of telephone network addresses.

U.S. Pat. No. 5,063,588 provides the identity of a calling subscriber to the called subscriber by requiring the calling subscriber to identify himself to a central station requesting access to communication resources. The central station then forwards the identity of the calling subscriber to the called subscriber enabling the called subscriber to decide whether to answer the call or not. Radio frequency communication links are utilized once a connection is established between the two subscriber units.

U.S. Pat. No. 5,070,521 pertains to wireless communication and the method for identifying the origin of calls through the communication unit. Calls from the telephone network typically provide a special prefix or suffix to alert the subscriber the call was made from the telephone network as a means to alert the operator.

U.S. Pat. No. 5,155,759 deals with simultaneous calling request signals for a plurality of portable telephones. When simultaneous requests are sent to portable telephones, any telephone that is busy will not receive the request. The requester will thus be aware that the busy telephone has not received the request. Accordingly, the response of any receiving portable telephone will be returned to the requester or calling party, followed by means of a display signal.

U.S. Pat. No. 5,228,073 discloses a caller identification display system with remote user units. It is indicated that the communication between the master and the remote may be by conventional interface electronics located in the reception unit with the remote units interconnected by cables, or by means of radio frequency or laser transmitter and receiver system.

U.S. Pat. No. 5,274,699 teaches a device that allows a signalling word to be transmitted from the transceiver section to the central controller indicating that it wishes to transmit. After this a central station accesses a data base to check for the identification transmitted by the requesting unit. The controller then selects the appropriate displayable source indicator and provides such display to the recipient unit.

U.S. Pat. No. 5,327,486 deals with an automated reception arrangement which utilizes a computer in a wireless system. In the arrangement taught, the name of the calling person is presented after which a reception judgment is made as to whether or not the call is important enough to notify the person being called by means of a wireless link.

None of the above units are believed to teach or claim a system like that disclosed herein.

Accordingly, it is the object of the present invention to provide a new and improved caller identification system which discloses a method to receive, display, process, and distribute caller information to remote areas.

SUMMARY OF THE INVENTION

The present invention relates to a calling or originating number identification device where in addition to the usual display the calling party number is presented to multiple users by means of a wireless medium. In the present invention, a system is disclosed to receive, display, process, and distribute caller information to remote areas. Of particular interest is the method to distribute line caller identification information to multiple users by means of the flexibility provided by utilization of a wireless medium.

A master unit connected to the telephone line receives, stores, and transmits the message then either by radio frequency (hereinafter RF) or infrared (hereinafter IR) or similar communication media. Remote units placed anywhere in the vicinity of the master unit can display the received information, or request information stored in or new caller information, from the master unit. In the proposed scheme, caller information processing allows the user to view caller information from remote areas related to that particular station apparatus, without extensive wiring and related cost.

In the usual arrangement, if a telephone subscriber is connected to a telephone company which provides caller number display services, the receiving subscriber then has the ability to identify the caller before answering a call. Typically, during the first and second ring of an incoming call, the telephone company provides frequency shift keyed modulated digital data relating to the caller's name and number. Within the master unit connected to a central office line is a line interface circuit connected in series to the telephone line which gives the status of the line to a related microcontroller. The status of the line would normally be "ON HOOK", "OFF HOOK", or "RINGING", or other tones on the line. A commercially available caller identification decoder could be utilized to demodulate the frequency shift keying information into the ASCII digital data.

The microcontroller is able to detect the first ring by the information provided from the line interface and then utilize the associated frequency shift keying decoder to record caller information. The microcontroller includes a stored program in a read-only memory (hereinafter ROM) and also utilizes a random-access memory (hereinafter RAM) to organize and store one or more pieces of caller information as a data base.

The local user at the master unit has a local key pad or display unit which facilitates programming of the unit as well as viewing or editing or manipulating information related to the caller data base. A wireless receiver utilizing RF or IR techniques connected to the microcontroller provides status of the remote units associated with the master unit. Normal status to be received at the master unit wireless receiver could be "CARRIER BUSY", "CARRIER FREE", "DATA IN", or "COLLISION". An associated wireless transmitter (utilizing RF or IR techniques) has the ability to transmit serial digital data out to the remote units.

The microcontroller, included in the master unit, includes digital input and output ports which are utilized to interface with wireless transceivers. Also included in the master unit are a line interface, frequency shift decoder, display, key pad, and a relay. A relay connected in series with the line is able to disconnect the microcontroller of the present invention from the telephone line by receiving a signal from the microcontroller.

Typically the master unit of the present invention, with either the factory program or user selected unique identification code, can operate the relay circuitry to connect or disconnect the master unit from the telephone central office line.

Each of the one or more remote units associated with the master unit of the present invention include a wireless (RF or IR) transmitter and receiver similar to those included in the master unit. Also included in each remote unit is a microcontroller, key pad and display. Like the microcontroller in the central office, those in each of the remote units also include a ROM program storage, as well as a RAM for use by the program. There is also included a serial data interface connected to the microcontroller for interfacing with a computer or similar device and input and output ports for interface with the wireless transceiver portion. Also provided are interfaces for the key pad and display. A factory programmed or user selected unique identification code may be read by the included microcontroller to determine the functions necessary for it to perform.

In operation, when the master unit receives caller identification information from the telephone central office, it will store the information in the data base of the microcontroller and indicate that it is the latest entry. At this time, the latest entry is then formatted into a data packet. The formatted single message packet can have a number of different pieces of information or codes for transfer to the master unit.

In some instances, the master unit is able to respond to multiple remote units by sending multiple messages at the same time. The specific codes are identified with this mode of operation wherein formatted multiple message packets are transmitted. After formatting the information, the included transmitter is then operated to transmit the information to the remote units. The transmitter then waits for the receiver to indicate that a "CARRIER FREE" status exists so that it may transmit. Should the carrier be busy, the transmitter will then wait for a preprogrammed time before checking the status of the carrier again. If the carrier is busy for more than the programmed number of times, an error message is generated marking communication failure and terminating operation at that time. Normally, channel scanning or spread spectrum techniques are employed to avoid such problems.

When carrier free status is determined, a message is transmitted to the remote units. A remote unit, if active, can then receive this and display the message. If the user at the remote unit presses a key on the remote unit, then the remote unit will generate a packet of information similar to that transmitted by the master unit. These messages may be transmitted in packet form by the remote unit utilizing a scheme similar to that employed by the master unit. After transmission of one such packet, the unit will stay powered and ready to receive response from the master unit. At this time, the master unit will provide service to the remote unit by sending out caller data or line information. To avoid bi-directional problems in data communication, or communication failure, techniques like multiple channel scanning technology, or spread spectrum technology, can be utilized.

When there is an incoming call in progress, the user can then see the caller information at the remote unit and press a "BLOCK KEY" to disconnect or redirect the call. When he presses the "BLOCK KEY", the remote unit will send the information to the master unit, the master unit will energize the relays to disconnect or redirect the call. The relay will be deenergized after the call completion status is determined by the line interface.

The serial interface provided at the remote unit enables the computer, or similar data device, to be connected to the remote unit to communicate with it and provide or interrogate data to or from the master unit.

Security in the system is enabled by the master unit and the remote unit communicating with common user programmed identification codes. A remote unit will not interpret data received from the master unit if the received packet's identification code does not match the stored identification code included in the remote unit. With such a security system in place, it is possible to employ multiple master and multiple remote units in a confined environment, thus facilitating the utilization of multiple lines in an office or similar environment.

BRIEF DESCRIPTION OF THE DRAWINGS

A better understanding of the present invention may be had from consideration of the following detailed description taken in conjunction with the accompanied drawings in which:

FIG. 3 is a block diagram showing application of a wireless caller information processing system in accordance with the present invention in a single line user application.

FIG. 4 is a block diagram of a wireless caller information processing system in accordance with the present invention as utilized in a multiple line user application.

DESCRIPTION OF THE PREFERRED EMBODIMENTS

Figure 1:
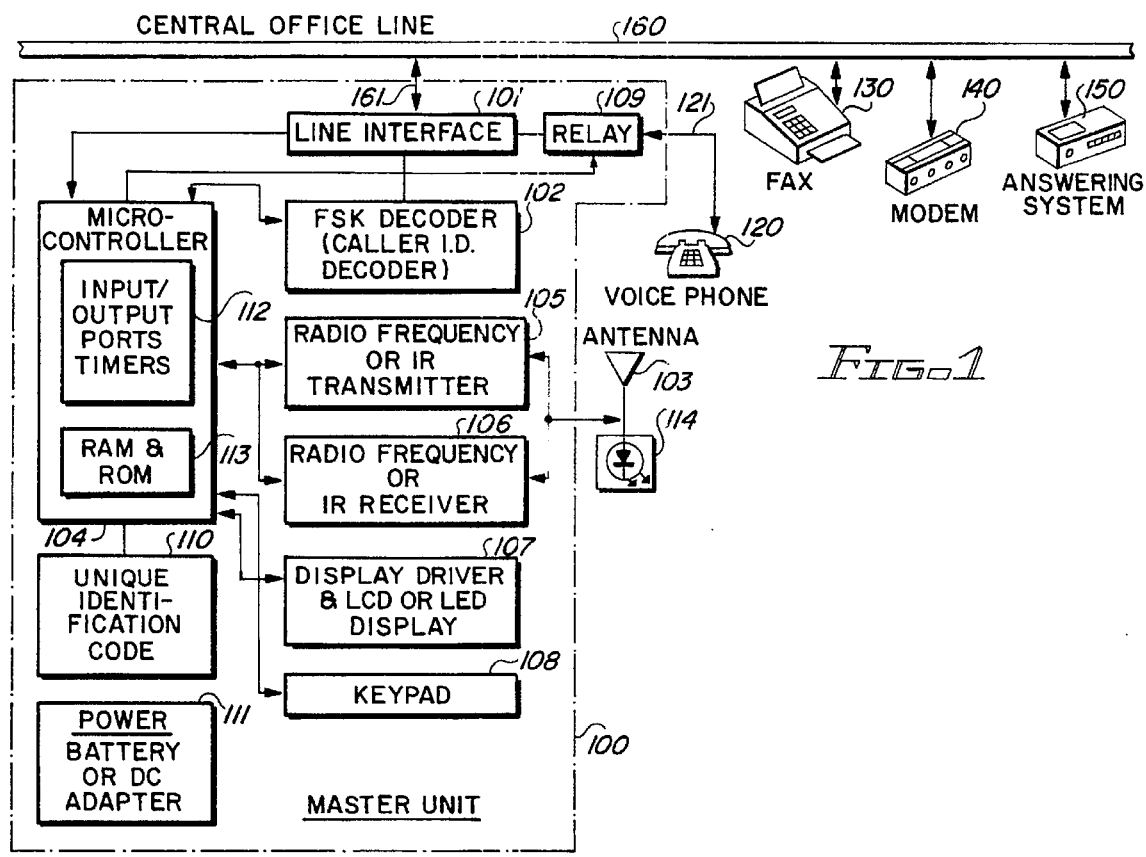
FIG. 1 is a block diagram of the master unit in a wireless caller information processing system in accordance with the present invention.

Referring now to FIG. 1 of the drawings, the master unit and equipment associated therewith are shown in either block or symbolic form. Detailed circuitry is not included herein inasmuch as the particular circuitry is well known to those skilled in the art, it being only required they perform the functions described hereinafter.

The master unit 100 has a direct connection to the telephone line 160, as well as one to a traditional alternate path or blocking telephone 120 via connection 121. Connection to the telephone central office 160 is achieved via connection 161. A line interface circuit 101 is connected in series with telephone 120. The purpose of line interface 101 being to determine the status of the line. The line interface circuit 101 consists of circuits that sense loop current, ring signals and different tones. It is also able to provide the necessary impedance matching for frequency shift key decoder 102 to which it is connected.

The frequency shift key decoder is a commercial unit which demodulates analog signals to generate serial data for insertion in the microcontroller 104. Microcontroller 104 includes input and output ports 112 and a memory 113 which includes both RAM and ROM portions. Microcontroller 104 is responsible for all the control and activity of the master unit 100. The stored program contained therein controls all the functions of the master unit. A unique identification code 110 programmed into the system by the user differentiates one master unit from other master unit systems and provides the necessary security. This unique information is read by the microcontroller when required.

Wireless transmitters 105 (RF or IR) help to transmit the packets of information in a serial stream. The wireless receiver 106 (RF or IR) receives information from associated remote units and also decides the status of carrier signals being received. The receiver 106 can detect multiple states like "CARRIER BUSY" to indicate that a transmission is in progress, "CARRIER FREE" ready to facilitate transmission, or "COLLISION" to detect a multiple device conflict. Antenna 103 and LED indicator 114 are connected to transmitter 105 and receiver 106.

Display unit 107 and key pad 108 provide interactive means to access caller data or to configure the device of the present system. Relay 109 can switch voice phone 120 on or off depending on user request. Power is supplied by a battery or DC adapter 111 which provides the necessary operating power for master unit 100. Also shown as being connected to the central office line 160, although not a direct portion of the present invention, are a FAX machine 130, a modem 140, and an answering system 150.

Figure 2:
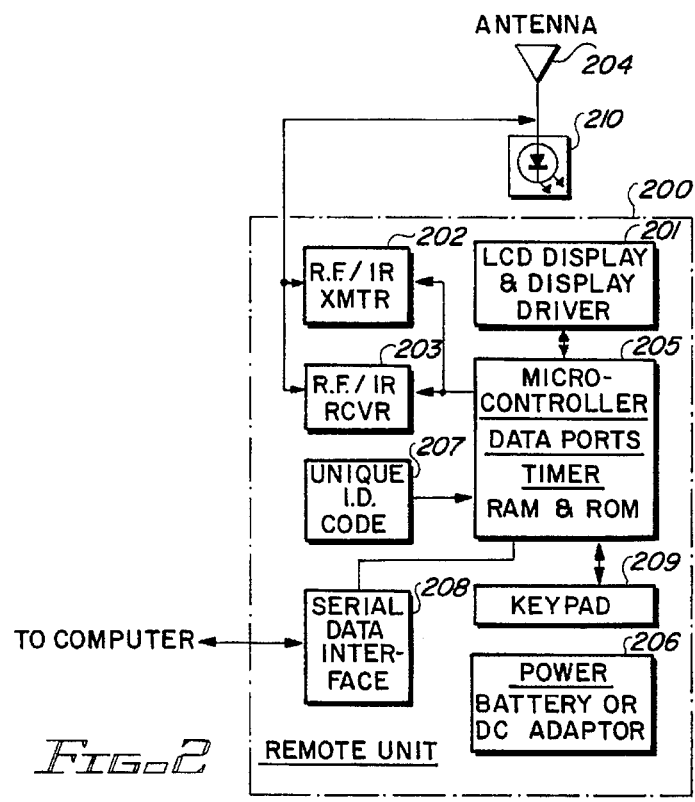
FIG. 2 is a block diagram of a remote unit for use in a wireless caller information processing system in accordance with the present invention.
Figure 5:
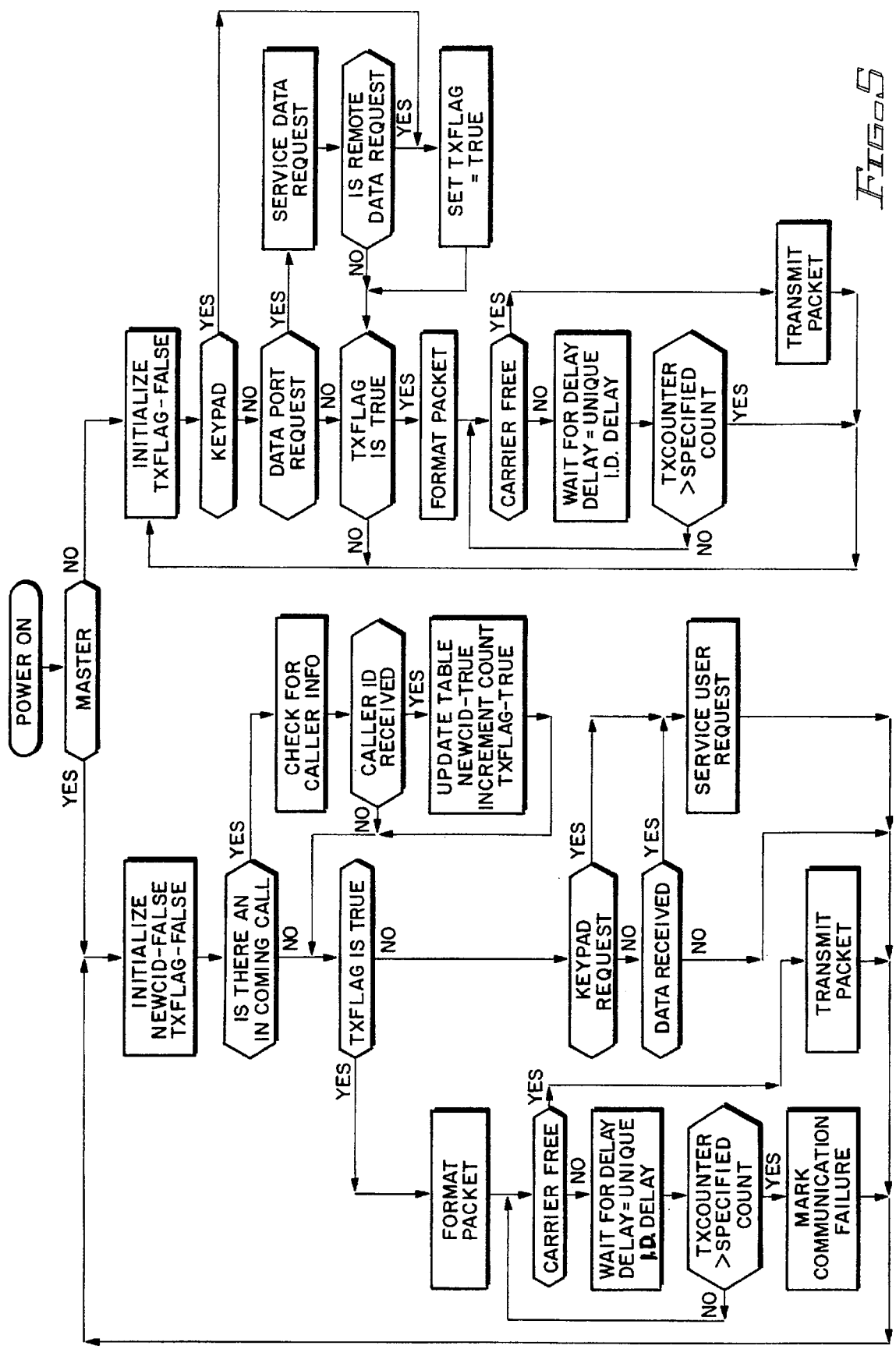
FIG. 5 is a flow chart showing operation of master and remote units in a wireless caller information processing system showing the flow of information in accordance with the present invention.

Referring now to FIG. 2, remote unit 200, is configured in many ways similar to that of master unit 100, in that it consists of a low power microcontroller 205 which is responsible for all the operations of the remote unit 200. A wireless transmitter (RF or IR) 202 and a wireless receiver (RF or IR) 203 which are utilized to achieve bi-directional communication with master unit 100 of FIG. 1.

In remote unit 200, a unique identification code 207 guarantees secure communication and avoids conflict with other remote units. Key pad 209 and display 201 again allow the user to interact with the master unit and obtain the desired caller information. Also shown in FIG. 2 are remote antenna 204 with LED indicator 210, a power source (battery or DC adapter) 206, and a serial data interface 208 for utilization and connection of all the remote units to enable the computer, or similar data device, to communicate with the remote units and the master unit, as well as provide the possibility for interrogation of data to or from the master unit.

Referring now to FIG. 3, a system diagram is shown indicating the flexibility of configuring the caller identification distribution system in a single line application. In this arrangement, the telephone central office line 308 is connected to the master unit and to the voice telephone 302, so if the user chooses the block option during a call in progress this particular telephone is disconnected, a remote unit such as 307 can be utilized as a stand alone unit, or may be used as an interface such as 301 to a related computer 306. The computer, through a serial interface, can utilize the remote unit automatically. Should there be caller information in the remote unit, the computer can obtain that information from the remote unit by sending a proper request over the serial line. If the computer requires this caller information, it can then send a command through the serial interface to the remote unit, the remote unit can then make the proper request to the master unit to redirect data from the master unit 300 to computer 306.

Referring now to FIG. 4, in an environment where there are multiple lines and many users, a cluster of master units 403, 404, and 405, each having a different identification code, can communicate with remote units 408, 409, and 410. Any of these units, in turn, could be connected to computer 411, or other data devices. Additional and alternate forms of operation following the normal "yes" paths for operation are available. Assuming that power is on at the master and it is in its initializing or monitoring mode (with no transmission taking place), a determination is made as to whether an incoming call is present. Assuming an incoming call is present, a check is made for caller information. If that caller information is present, the caller identity is then received by the master unit via frequency shift keying information. This is stored in the microcontroller 104, then updated after which the determination is made as to whether or not the transmission flag is true, i.e., the transmitter is available. If the transmission flag is true, the information received and available in memory in the microcontroller 104 is formatted and after this a determination is made as to whether the carrier is free, and should the carrier be free, then the formatted packet of information is transmitted via a wireless transmitter such as 105. This information is then received at the remote unit which functions in the manner previously described.

While but a single embodiment of the present invention has been shown, it will be obvious to those skilled in the art that numerous modifications may be made without departing from the spirit of the present invention, which shall be limited only by the scope of the claims appended hereto.

What is claimed is:

1. A wireless caller information processing system comprising:

at least one master unit, including wireless transmission means, connected to a telephone central office via a central office telephone line;

at least one remote unit, including wireless receiving means and display means connected to said wireless receiving means;

said remote unit located within wireless communication range of said master unit;

said master unit in response to receipt of signals representative of the identity of the source of an incoming call received over said telephone line at said master unit, to operate said wireless transmission means to transmit said identity signals to said remote unit;

said remote unit in response to receipt of said identity signals by said wireless receiving means to operate said display means to provide a visual indication at said remote unit of the identity of said source of the incoming call received at said master unit;

said master unit including a decoder connected to a microcontroller with a line interface connected between said central office telephone line and said decoder, said decoder operated in response to receipt of said identity signals to said line interface from said central office telephone line, to convert said identity signals from a first code to a second code, and further operated to transmit said identity signals in said second code to said microcontroller.

2. A wireless caller information processing system as claimed in claim 1 wherein:

said decoder converts said identity signals from a frequency shift keying code to an ASCII code.

3. A wireless caller information processing system as claimed in claim 1 wherein:

said microcontroller includes identification code means and memory means;

said memory means operated to store unique identification code from said unique identification code means and said identity signals in said second code.

4. A wireless caller information processing system as claimed in claim 1 wherein:

there is further included wireless receiving means connected to said microcontroller operated in response to receipt of signals representative of the identity of said remote unit to further operate said microcontroller to operate said wireless transmission means to transmit said identity signals to said remote unit.

5. A wireless caller information processing system as claimed in claim 1 wherein:

there is further included display means and a key pad, both including circuit connections to said microcontroller;

said display operated in response to information stored in said microcontroller memory to provide a visual indication of information stored in said memory;

and said key pad manually operated to input information into said memory included in said microcontroller.

6. A wireless caller information processing system as claimed in claim 1 wherein:

said remote unit further includes a microcontroller connected between said wireless receiving means and said display means;

said microcontroller further including memory means operated in response to receipt of identity signals at said wireless receiving means to operate said display means to provide said visual indication at said remote unit of the identity of said source of said incoming call received at said master unit.

7. A wireless caller information processing system as claimed in claim 6 wherein:

said remote unit further includes unique identification code means connected to said microcontroller and wireless transmission means connected to said microcontroller operated in response to said microcontroller to transmit said unique identification code to said master unit to identify said remote unit.

8. A wireless caller information processing system as claimed in claim 6 wherein:

there is further included a serial data interface connected to said microcontroller adapted to connect information stored in said memory included in said microcontroller to external data utilization means.

9. A wireless caller information processing system as claimed in claim 7 wherein:

said microcontroller includes a plurality of circuit connections to said wireless transmission means and said wireless receiving means, as well as circuit connections to a unique identification code means, a key pad and a serial data interface.

10. A wireless caller information processing system as claimed in claim 4 wherein:

said master unit includes signal distribution means connected to said wireless transmission means operated to distribute signals from said wireless transmitter to said remote unit.

11. A wireless caller information processing system as claimed in claim 10 wherein:

said signal distribution means further includes circuit connections to said wireless receiving means operated to couple signals identifying said remote unit received from said remote unit to said wireless receiving means.

12. A wireless caller information processing system as claimed in claim 7 wherein:

said remote unit includes signal distribution means connected to said wireless transmission means operated to distribute signals from said wireless transmitter to said master unit.

13. A wireless caller information processing system as claimed in claim 12 wherein:

said signal distribution means further include circuit connections to said wireless receiving means operated to couple signals from said master unit received from said master unit to said wireless receiving means.

14. A wireless caller information processing system as claimed in claim 1 wherein:

there is further included intercept means connected to said line interface means at said master unit.

15. A wireless caller information processing system as claimed in claim 14 wherein:

said intercept means include a relay operated to disconnect said line interface unit from said central office telephone line.

\* \* \* \* \*